(12) United States Patent  (10) Patent No.: US 8,705,965 B2
Sugawa et al.  (45) Date of Patent: Apr. 22, 2014

(54) METHOD OF RECOVERY FROM SLEEP STATE OF AN ONU IN A PON SYSTEM CAPABLE OF POWER SAVING

(75) Inventors: Jun Sugawa, Kamakura (JP); Hiroki Ikeda, Hachioji (JP); Tohru Kazawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 557 days.

(21) Appl. No.: 12/987,753

(22) Filed: Jan. 10, 2011

(65) Prior Publication Data

US 2011/0211837 A1  Sep. 1, 2011

(30) Foreign Application Priority Data

Feb. 26, 2010  (JP) ................................. 2010-041269

(51) Int. Cl.
*H04J 14/00* (2006.01)
(52) U.S. Cl.
USPC .................... 398/67; 398/66; 398/70; 398/71; 398/98
(58) Field of Classification Search
USPC ................ 398/58, 66, 67, 70, 71, 72, 98–103
See application file for complete search history.

(56) References Cited

U.S. PATENT DOCUMENTS

| 5,905,443 | A * | 5/1999 | Olds et al. ..................... 340/7.27 |
| 6,463,307 | B1 * | 10/2002 | Larsson et al. ................ 455/574 |
| 6,563,307 | B2 * | 5/2003 | Trantow et al. ............... 324/219 |
| 6,735,454 | B1 * | 5/2004 | Yu et al. ......................... 455/574 |
| 7,457,612 | B2 * | 11/2008 | Kurokawa et al. ......... 455/412.1 |
| 7,734,178 | B2 * | 6/2010 | Sakamoto et al. .............. 398/67 |
| 8,000,602 | B2 * | 8/2011 | Haran et al. ..................... 398/72 |
| 8,036,532 | B2 * | 10/2011 | Sakamoto et al. .............. 398/67 |
| 8,260,135 | B2 * | 9/2012 | Kazawa et al. ................. 398/68 |
| 8,275,261 | B2 * | 9/2012 | Mandin et al. .................. 398/72 |
| 8,320,965 | B2 * | 11/2012 | Kwun et al. .................. 455/561 |
| 8,432,854 | B2 * | 4/2013 | Cordeiro et al. .............. 370/328 |
| 8,457,492 | B2 * | 6/2013 | Ohira et al. ..................... 398/58 |
| 8,467,677 | B2 * | 6/2013 | Straub et al. .................... 398/20 |

(Continued)

FOREIGN PATENT DOCUMENTS

| CN | 1323495 A | 11/2001 |
| CN | 1393074 A | 1/2003 |

(Continued)

OTHER PUBLICATIONS

Chinese Office Action Dated May 6, 2013 {Seven (7) Pages}.

(Continued)

*Primary Examiner* — Daniel Washburn
*Assistant Examiner* — Hibret Woldekidan
(74) *Attorney, Agent, or Firm* — Crowell and Moring LLP

(57) ABSTRACT

There is a need to recover an ONU from a sleep state for communication with the PON before a specified sleep cancel time in a short period of time without degrading the band use efficiency. An OLT manages an electric state of each ONU connected to a PON. When at least one ONU is in sleep mode, the OLT transmits a grant to allocate a band for a sleep cancel report to the ONU. When the sleep-mode ONU requires communication, the ONU transmits the sleep cancel report to the OLT using the band for the sleep cancel report. When receiving the sleep cancel report, the OLT changes the managed ONU to a normal state and resumes the communication with the PON.

10 Claims, 21 Drawing Sheets

(56) References Cited

U.S. PATENT DOCUMENTS

| | | | |
|---|---|---|---|
| 8,477,650 B2 * | 7/2013 | Greenberg et al. | 370/252 |
| 8,521,025 B2 * | 8/2013 | Ansari et al. | 398/68 |
| 2003/0103446 A1 | 6/2003 | Negishi et al. | |
| 2004/0097268 A1 | 5/2004 | Kurokawa et al. | |
| 2007/0183786 A1 * | 8/2007 | Hinosugi et al. | 398/140 |
| 2011/0318008 A1 * | 12/2011 | Kubo et al. | 398/66 |
| 2012/0045201 A1 * | 2/2012 | Skubic et al. | 398/38 |
| 2012/0045210 A1 * | 2/2012 | Kim et al. | 398/66 |
| 2012/0051748 A1 * | 3/2012 | Hotta et al. | 398/58 |
| 2012/0114331 A1 * | 5/2012 | Kamijo et al. | 398/35 |
| 2012/0120859 A1 * | 5/2012 | Stephens et al. | 370/311 |
| 2012/0128357 A1 * | 5/2012 | Mukai et al. | 398/58 |
| 2012/0141119 A1 * | 6/2012 | Konno et al. | 398/25 |
| 2012/0148246 A1 * | 6/2012 | Mukai et al. | 398/58 |
| 2012/0315885 A1 * | 12/2012 | Shintani | 455/418 |
| 2013/0202302 A1 * | 8/2013 | Kubo et al. | 398/66 |

FOREIGN PATENT DOCUMENTS

| | | |
|---|---|---|
| CN | 1451247 A | 10/2003 |
| CN | 101491143 A | 7/2009 |
| JP | 2003-517741 A | 5/2003 |
| JP | 2004-172772 A | 6/2004 |
| JP | A-2009-171424 | 7/2009 |

OTHER PUBLICATIONS

Jeff Mandin, "EPON Powersaving via Sleep Mode", Sep. 2008, (Four (4) pages).

"Part 3: Carrier Sense Multiple Access with Collision Detection (CSMA/CD) Access Method and Physical Layer Specificaitons", Amendment to IEEE Std 802.3-2008 pp. 171-208.

Office Action of JP 2010-041269, dated Sep. 3, 2013 (English-language; 2 pages).

* cited by examiner

PON SYSTEM

PON PHY/MAC LOGIC CIRCUIT (FOR OLT)

PON PHY/MAC LOGIC CIRCUIT (FOR ONU)

FLOWCHART FOR UPSTREAM RECEPTION FRAME ANALYSIS
OF THE OLT ACCORDING TO THE PRESENT INVENTION

SEQUENCE 1 ACCORDING TO THE PRESENT INVENTION

SEQUENCE 3 ACCORDING TO THE PRESENT INVENTION

FIG. 14

EPON FRAME FORMAT

| | | Octets |
|---|---|---|
| F101 — Preamble/SFD | | 8 |
| F102 — Destination Address | | 6 |
| F103 — Source Address | | 6 |
| F104 — Length/Type | | 2 |
| F105 — Opcode | | 2 |
| F106 — Timestamp | | 4 |
| F107 — Data/Pad/Reserved | | 40 |
| F108 — FCS | | 4 |

| | Octets |
|---|---|
| 0x5555 | 2 |
| SLD | 1 |
| 0x5555 | 2 |
| LLID | 2 |
| CRC8 | 1 |

FIG. 15

Normal Gate MPCPDU FRAME FORMAT

| | | Octets |
|---|---|---|
| F201 | Destination Address | 6 |
| F202 | Source Address | 6 |
| F203 | Length/Type = 0x8808 | 2 |
| F204 | Opcode = 0x0002 | 2 |
| F205 | Timestamp | 4 |
| F206 | Number of grants/Flags | 1 |
| F207 | Grant #1 Start time | 0/4 |
| F208 | Grant #1 Length | 0/2 |
| F209 | Grant #2 Start time | 0/4 |
| F210 | Grant #2 Length | 0/2 |
| F211 | Grant #3 Start time | 0/4 |
| F212 | Grant #3 Length | 0/2 |
| F213 | Grant #4 Start time | 0/4 |
| F214 | Grant #4 Length | 0/2 |
| F215 | Pad/Reserved | 15-39 |
| F216 | FCS | 4 |

FIG. 16

Discovery Gate MPCPDU FRAME FORMAT

| | | Octets |
|---|---|---|
| F301 | Destination Address | 6 |
| F302 | Source Address | 6 |
| F303 | Length/Type = 0x8808 | 2 |
| F304 | Opcode = 0x0002 | 2 |
| F305 | Timestamp | 4 |
| F306 | Number of grants/Flags | 1 |
| F307 | Grant #1 Start time | 4 |
| F308 | Grant #1 Length | 2 |
| F309 | Sync Time | 2 |
| F310 | Discovery Information | 2 |
| F311 | Pad/Reserved | 29 |
| F312 | FCS | 4 |

FIG. 17

Report MPCPDU FRAME FORMAT

| | | Octets |
|---|---|---|
| F401 — | Destination Address | 6 |
| F402 — | Source Address | 6 |
| F403 — | Length/Type = 0x8808 | 2 |
| F404 — | Opcode = 0x0003 | 2 |
| F405 — | Timestamp | 4 |
| F406 — | Number of queue sets | 1 |
| F407 — | Report bitmap | 1 |
| F408 — | Queue #0 Report | 0/2 |
| F409 — | Queue #1 Report | 0/2 |
| F410 — | Queue #2 Report | 0/2 |
| F411 — | Queue #3 Report | 0/2 |
| F412 — | Queue #4 Report | 0/2 |
| F413 — | Queue #5 Report | 0/2 |
| F414 — | Queue #6 Report | 0/2 |
| F415 — | Queue #7 Report | 0/2 |
| F416 — | Pad/Reserved | 0-39 |
| F417 — | FCS | 4 |

Repeated n times indicated by Number of Queue sets (F406–F415)

FIG. 18

Sleep Request MPCPDU FRAME FORMAT

| | | Octets |
|---|---|---|
| F501 | Destination Address | 6 |
| F502 | Source Address | 6 |
| F503 | Length/Type = 0x8808 | 2 |
| F504 | Opcode = 0x0007 | 2 |
| F505 | Timestamp | 4 |
| F506 | Max Sleep Time | 4 |
| F507 | Pad/Reserved | 36 |
| F508 | FCS | 4 |

FIG. 19

Sleep Grant MPCPDU FRAME FORMAT

| | | Octets |
|---|---|---|
| F601 | Destination Address | 6 |
| F602 | Source Address | 6 |
| F603 | Length/Type = 0x8808 | 2 |
| F604 | Opcode = 0x0008 | 2 |
| F605 | Timestamp | 4 |
| F606 | Sleep Permission | 1 |
| F607 | WakeUpTime | 4 |
| F608 | Pad/Reserved | 35 |
| F609 | FCS | 4 |

FIG. 20

Sleep Cancel Report MPCPDU FRAME FORMAT

| | | Octets |
|---|---|---|
| F701 | Destination Address | 6 |
| F702 | Source Address | 6 |
| F703 | Length/Type = 0x8808 | 2 |
| F704 | Opcode = 0x0009 | 2 |
| F705 | Timestamp | 4 |
| F706 | Number of queue sets | 1 |
| F707 | Report bitmap | 1 |
| F708 | Queue #0 Report | 0/2 |
| F709 | Queue #1 Report | 0/2 |
| F710 | Queue #2 Report | 0/2 |
| F711 | Queue #3 Report | 0/2 |
| F712 | Queue #4 Report | 0/2 |
| F713 | Queue #5 Report | 0/2 |
| F714 | Queue #6 Report | 0/2 |
| F715 | Queue #7 Report | 0/2 |
| F716 | Pad/Reserved | 0-39 |
| F717 | FCS | 4 |

Repeated n times indicated by Number of Queue sets (F708–F715)

FIG. 21

BAND ALLOCATION MANAGEMENT TABLE IN Sleep MODE

| ONU ID | Gate TRANSMISSION CYCLE IN Sleep MODE | BAND ALLOCATED IN Sleep MODE |
|---|---|---|
| 1 | N1 * T_dba | T_length_1 |
| 2 | N2 * T_dba | T_length_2 |
| ... | | |
| n | Nn * T_dba | T_length_n |

FIG. 22

ONU REGISTRATION STATE MANAGEMENT TABLE

| ONU ID | ONU STATE | INITIALIZATION PARAMETER | | | |
|---|---|---|---|---|---|
| | | LLID | Ton | Toff | Sync Time |
| 1 | REGISTERED | 1001 | 128 | 128 | 512 |
| 2 | SLEEP | 1002 | 256 | 256 | 512 |
| ... | | | | | |
| n | UNREGISTERED | N/A | N/A | N/A | N/A |

SEQUENCE 2 ACCORDING TO A CONVENTIONAL EXAMPLE

METHOD OF RECOVERY FROM SLEEP STATE OF AN ONU IN A PON SYSTEM CAPABLE OF POWER SAVING

CLAIM OF PRIORITY

The present application claims priority from Japanese patent application JP 2010-041269 filed on Feb. 26, 2010, the content of which is hereby incorporated by reference into this application.

FIELD OF THE INVENTION

The present invention relates to a method of recovering from a low-power state of a terminal unit in a communication system capable of power saving for terminal units.

BACKGROUND OF THE INVENTION

Widespread Use of Optical Access Network

As the Internet is coming into widespread use, there is an increasing demand for high-speed networks. ADSL (Asymmetric Digital Subscriber Line), B-PON (Broadband PON), E-PON (Ethernet PON), and G-PON (Gigabit Capable PON) are in widespread use. Specifically, a PON system includes an optical line terminal (OLT) installed in a station and an optical network unit (ONU) installed in each user's home. An optical splitter splits a single fiber cable from the OLT into users for connection between the OLT and each of ONUs. The PON system can reduce fiber cabling costs and provide high-speed transmission because of optical transmission. The PON system becomes popular for all the countries of the world.

Increase in the Communication Speed and Power Consumption

As frequency bands allocated for users expand, optical access networks are requested to accelerate communication speeds. The IEEE 802.3av standard standardizes 10G-EPON capable of the communication speed at 10 Gbps upstream and downstream (refer to IEEE 802.3av). As communication speeds increase, electronic parts and units such as OLTs and ONUs are expected to consume more electric power.

Requests for Reduction of Power Consumption in Network Devices

Along with the recent trend toward the reduction of environmental burdens, network devices are requested to reduce the power consumption. However, the optical access network tends to increase the power consumption while an increase in optical line subscribers also increases the number of devices and an increase in the communication speed also increases the power consumption per device. Accordingly, optical access network devices require reducing the power consumption. Another possible reason for reducing the power consumption is to ensure the communication infrastructure in the event of a power failure or other disasters. When a power failure occurs, devices are considered to work on batteries. The long battery life is desirable in terms of the ensured communication infrastructure. Therefore, devices need to reduce power consumption.

Conventional Power Saving Technology for PON Systems

A known power saving technology for PON systems is to use the sleep mode for ONUs. The sleep mode changes an ONU to a power-saving state. The ONU operates while switching between a normal mode for normal power consumption and the sleep mode for low power consumption. A known method of sleeping the ONU determines the time to enable and the time to cancel the sleep mode in accordance with communication between the OLT and ONU (e.g., IEEE P802.3av Task Force "3av_0809_mandin_4.pdf"). After the time to cancel the sleep mode, the ONU receives a frame allocated to an upstream band from the OLT and then resumes the normal mode to be ready for upstream data transmission.

Conventional Power Saving Technology for Wireless Systems

As disclosed in JP-T-2003-517741 and JP-A-2004-172772, for example, the power saving methods for wireless systems use the sleep mode for terminal stations. To reduce the amount of delay and the power consumption in the wireless system, a terminal station exits from the sleep mode by transmitting a sleep cancel report to the base station in response to reception of cyclically transmitted notification information.

SUMMARY OF THE INVENTION

According to the method described in IEEE P802.3av Task Force "3av_0809_mandin_4.pdf", communication with a PON is disabled until the sleep cancel time. A delay occurs in the upstream communication. The amount of delay in the upstream communication may be decreased when the frequency to operate the ONU in the normal mode is increased. However, this increases the power consumption. It is difficult to decrease the amount of delay in the upstream communication and the power consumption at the same time. Specifically, according to the method described in IEEE P802.3av Task Force "3av_0809_mandin_4.pdf" for decreasing the amount of delay in the upstream communication, the OLT needs to communicate with the ONU to periodically disable the low power consumption mode of the ONU even when no communication is needed between the OLT and the ONU. The ONU frequently remains in the normal mode and cannot sufficiently reduce the hourly-averaged power consumption. For example, let us suppose the power consumption in the normal mode to be Pn=10 W, the power consumption in the sleep mode to be Ps=1 W, the time duration remaining in the normal mode to be Tn=1 ms, and the time duration remaining in the sleep mode to be Ts=9 ms. Then, the hourly-averaged power consumption can be calculated as Paverage=(Pn×Tn+Ps×Ts)/(Tn+Ts)=1.9 W. In this case, the use of the sleep mode causes the amount of delay to be 10 ms in the ONU. While the amount of delay can be limited to 10 ms, the power consumption is 1.9 W, larger than Ps, and is needed to be more decreased. It is desirable to decrease both the amount of delay in the upstream communication and the power consumption. As mentioned above, the method described in JP-T-2003-517741 or JP-A-2004-172772 transmits a sleep cancel report in response to reception of cyclically transmitted notification information. This method degrades the band use efficiency for upstream communication in E-PON or 10G-EPON used for an optical access system. Specifically, a frame available as cyclical notification information for E-PON or 10G-EPON is equivalent to Discovery Gate cyclically transmitted from the OLT to all ONUs. Discovery Gate is used to register or unregister a new ONU. However, additional Discovery Window is required for the sleep cancel report so as to transmit it from the ONU to the OLT. Communication from the other ONUs to the OLT is disabled during the Discovery Gate period. The upstream band use efficiency is degraded. FIG. 23 shows an operation sequence in which the ONU transmits a sleep cancel report to the OLT in response to Discovery Gate transmitted from the OLT. In this example, ONU #1 changes its state from normal, sleep, and then to normal in succession. ONU #2 remains the normal state. When receiving the second Discovery Gate, ONU #1 uses Discovery Window to transmit Sleep Cancel Report to the OLT. ONU #2 cannot upstream communicate with the OLT during the Discovery Window period. The upstream band use efficiency is degraded. The cycle to transmit Discovery Gate needs to be shortened so that ONU #1 shortens the delay time for upstream data transmission. In this case, the upstream band use efficiency is further degraded. No collision occurs during the upstream communication from the other terminals to the base station in a wireless communication system that divides frequencies or the time for each terminal during the communication. No collision occurs during the upstream communication with the other terminals even when the sleep mode is canceled in response to a notification signal. Such a wireless communication system requires no Discovery Window. The upstream band use efficiency is not degraded due to the use of Discovery Window. Accordingly, there is a need to provide a means for preventing degradation of the upstream band use efficiency, decreasing the amount of delay in the upstream communication, and increasing the sleep mode time (i.e., reducing the power consumption) at the same time.

The present invention has been made in consideration of the foregoing. It is therefore an object of the invention to prevent the upstream band use efficiency from degrading and decrease the amount of delay in upstream communication even when the sleep mode is long (so as to be able to decrease the power consumption).

According to one aspect of the present invention, there is provided a communication system that includes at least one terminal unit and a control unit and exchanges data between the terminal unit and the control unit. The terminal unit includes: a reception section that receives a frame transmitted from the control unit; a transmission section that transmits a frame to the control unit; a control circuit that processes the frame; and a sleep control circuit that enables a power-saving state for at least one of the terminal units. The control unit includes: a reception section that receives a frame transmitted from the terminal unit; a transmission section that transmits a frame to the terminal unit; and a control circuit that processes the frame. The control circuit of the control unit cyclically allocates, to the power-saving terminal unit, a band for the terminal to transmit a sleep cancel report to the control unit and uses a transmission section of the control unit to cyclically transmit a control frame containing allocation information about the band to the power-saving terminal unit.

According to the invention, the communication with the PON, when needed, can be resumed earlier than the sleep cancel time. Accordingly, it is possible to decrease the amount of delay in upstream communication. The invention enables the communication with the PON to be resumed early even though a long sleep period is provided for the ONU. It is possible to extend the ONU sleep period and consume less power than conventional technologies.

Further, an additional band for the sleep cancel report is allocated only to a sleep-state ONU. It is possible to prevent the upstream band use efficiency from degrading considerably.

BRIEF DESCRIPTION OF THE DRAWINGS

FIG. 14 illustrates an EPON frame format;

FIG. 15 illustrates a Normal Gate frame format;

FIG. 16 illustrates a Discovery Gate frame format;

FIG. 17 illustrates a Report frame format;

FIG. 18 illustrates a Sleep Request frame format;

FIG. 19 illustrates a Sleep Grant frame format;

FIG. 20 illustrates a Sleep Cancel Report frame format;

FIG. 21 illustrates an upstream band allocation management table maintained in the OLT under a sleep condition;

FIG. 22 illustrates an ONU registration state management table according to the invention.

DETAILED DESCRIPTION OF THE PREFERRED EMBODIMENTS

Figure 1:
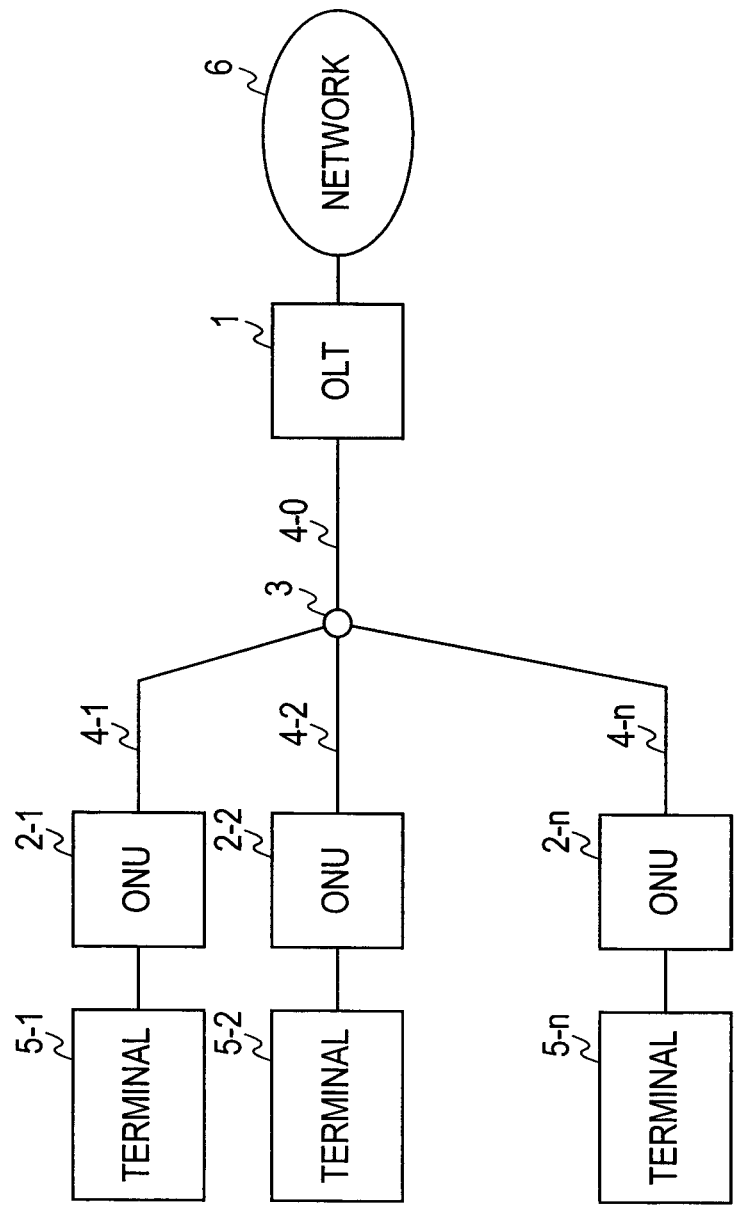
FIG. 1 illustrates a configuration of an optical access system according to the invention.

Embodiments of the present invention will be described in further detail with reference to the accompanying drawings. The mutually corresponding parts in the drawings are designated by the same reference numerals.

First Embodiment

FIG. 1 shows an optical access network using a PON. The optical access network includes an OLT 1, an optical splitter 3, and multiple ONUs 2 (2-1 through 2-n). The OLT 1 is connected to the optical splitter 3 through an optical fiber 4-0. The ONUs 2 (2-1 through 2-n) are each connected to the optical splitter 3 through the optical fibers 4 (4-1 through 4-n). Terminals 5 (5-1 through 5-n) are connected to the ONUs 2 (2-1 through 2-n), respectively. A network 6 is connected to the OLT 1. The terminal 5 is connected to the network 6 through the optical access network.

Figure 2:
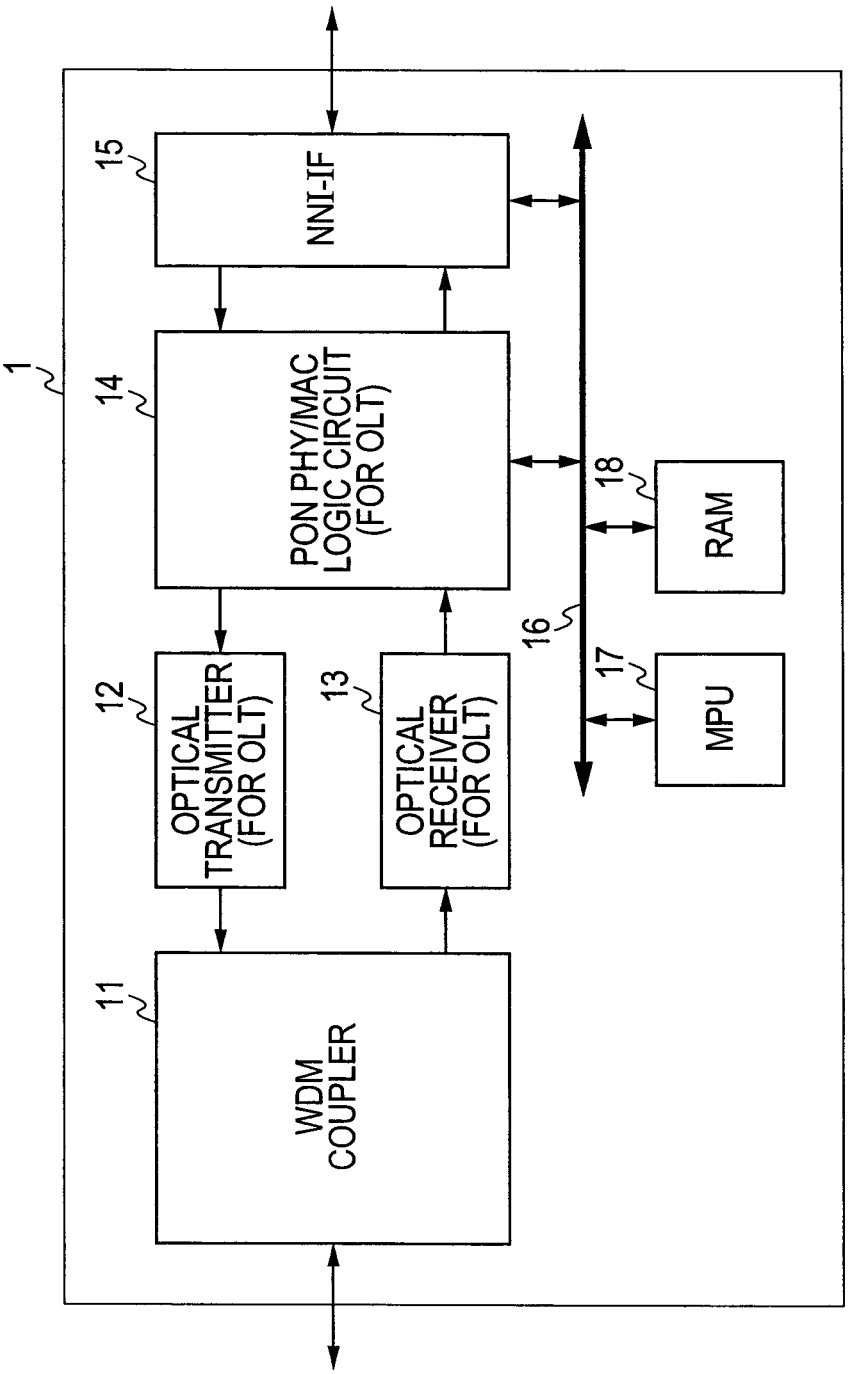
FIG. 2 is a block diagram illustrating an OLT configuration.

FIG. 2 shows a block configuration of the OLT used for the PON. The OLT 1 includes a WDM coupler 11, an optical transmitter 12, an optical receiver 13, a PON PHY/MAC logic circuit 14, an NNI-IF circuit 15, a bus 16, an MPU 17, and RAM 18. Functions of the components will be described.

Functions of the WDM Coupler 11

The WDM coupler 11 multiplexes and demultiplexes wavelength λ1 for upstream communication and wavelength λ2 for downstream communication in the PON. An upstream communication optical signal with wavelength λ1 is input to the WDM coupler 11 from the optical fiber 4-0 and is output to the optical receiver 13. A downstream communication optical signal with wavelength λ2 is input from the optical transmitter 12 and is output to the optical fiber 4-0.

Functions of the Optical Transmitter 12

The optical transmitter 12 receives an electric signal from the PON PHY/MAC logic circuit 14, converts the received signal into an optical signal with wavelength λ2, and outputs it to the WDM coupler 11.

Functions of the Optical Receiver 13

The optical receiver 13 receives an optical signal with wavelength λ1 from the WDM coupler 11, converts the received optical signal into an electric signal, amplifies and shapes the electric signal, and outputs it to the PON PHY/MAC logic circuit 14.

Functions of the PON PHY/MAC Logic Circuit 14

The PON PHY/MAC logic circuit 14 generates a PON frame format based on data input from the NNI-IF circuit 15. The PON PHY/MAC logic circuit 14 converts the PON frame format from parallel to serial and outputs it to the optical transmitter 12. The PON PHY/MAC logic circuit 14 generates a control frame, converts it from parallel to serial, and then outputs it to the optical transmitter 12. The PON PHY/MAC logic circuit 14 receives an electric signal from the optical receiver 13, regenerates a clock, and converts the signal from serial to parallel. The PON PHY/MAC logic circuit 14 then analyzes the received frame and performs a process associated with the frame type. When receiving a user transmission frame, the PON PHY/MAC logic circuit 14 transmits its data to the NNI-IF circuit 15.

Functions of the NNI-IF Circuit 15

The NNI-IF circuit 15 receives a frame from the network 6 and outputs it to the PON PHY/MAC logic circuit 14. The NNI-IF circuit 15 receives a frame from the PON PHY/MAC logic circuit 14 and outputs it to the network 6.

Functions of the Bus 16, the MPU 17, and the RAM 18

The MPU 17 and the RAM 18 are connected to the PON PHY/MAC logic circuit 14 and the NNI-IF circuit 15 through the bus 16. The MPU 17 performs processes that are not performed in the PON PHY/MAC logic circuit. The RAM 18 is used as a packet buffer for upstream and downstream communication and as memory for operations in the MPU 17.

Detailed Operations of the PON PHY/MAC Logic Circuit 14

Figure 3:
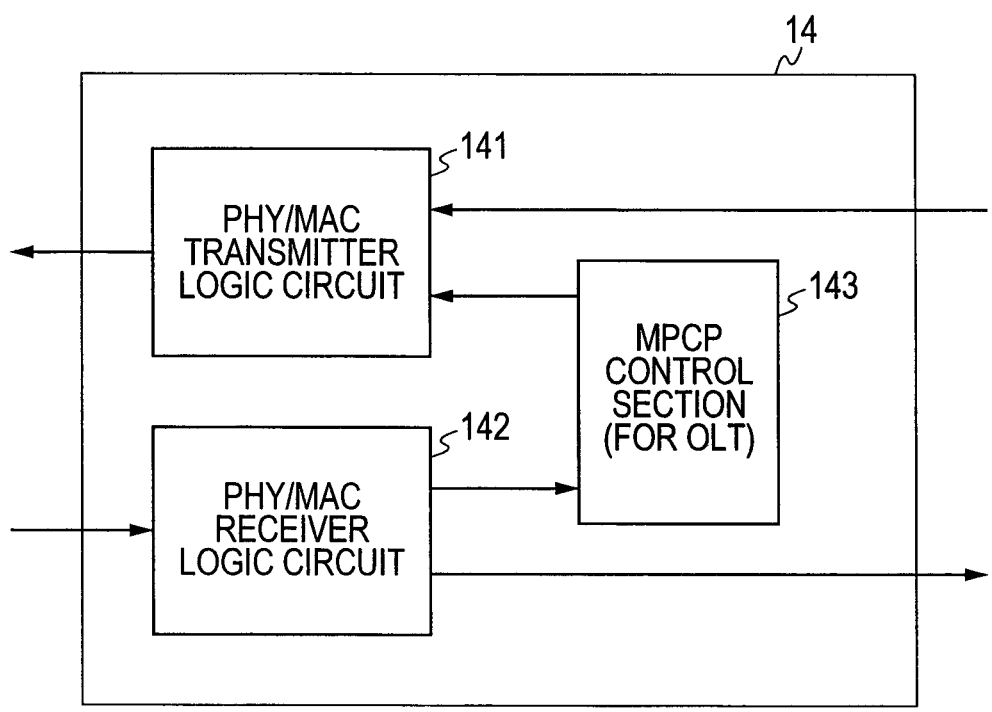
FIG. 3 is a block diagram illustrating a configuration of a PON PHY/MAC logic circuit for the OLT.

Operations of the PON PHY/MAC logic circuit 14 will be described in detail with reference to FIG. 3. The PON PHY/MAC logic circuit 14 includes a PHY/MAC transmitter logic circuit 141 and an MPCP control circuit 143. The following describes functions of the components.

A PHY/MAC receiver logic circuit 142 receives an electric signal from the optical receiver (for OLT) 13, regenerates a clock, converts the signal from serial to parallel, and decodes the signal. The PHY/MAC receiver logic circuit 142 detects a frame start position from the decoded bit string and analyzes the frame header. When the received frame is identified as an MPCP control frame according to the analysis result, the PHY/MAC receiver logic circuit 142 transmits the frame to the MPCP control circuit (for OLT) 143. When the received frame is identified as a user transmission frame, the PHY/MAC receiver logic circuit 142 transmits the frame to the NNI-IF circuit 15.

The PHY/MAC transmitter logic circuit 141 receives a frame from the NNI-IF 15 circuit or the MPCP control circuit (for OLT) 143. The PHY/MAC transmitter logic circuit 141 provides the frame with a header within the PON area, encodes the frame, converts it from parallel to serial, and transmits it to the optical transmitter (for OLT) 12.

The MPCP control circuit (for OLT) transmits and receives an MPCP control frame based on a predetermined protocol so as to register or unregister an ONU or control the upstream transmission timing.

Figure 4:
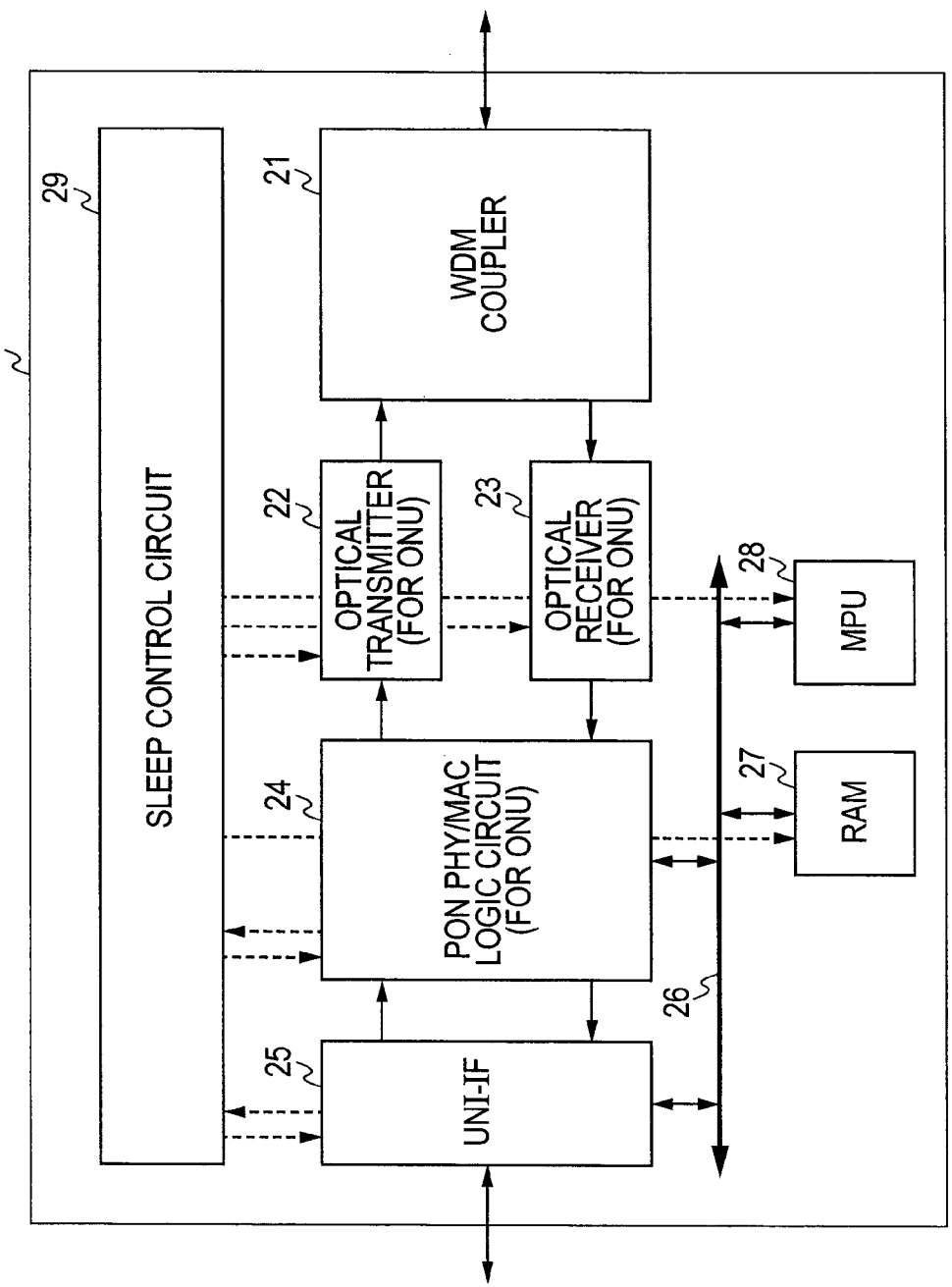
FIG. 4 is a block diagram illustrating an ONU configuration.

FIG. 4 shows a block configuration of the ONU used for the PON. The ONU 2 includes a WDM coupler 21, an optical transmitter 22, an optical receiver 23, a PON PHY/MAC logic circuit 24, an NNI-IF circuit 25, a bus 26, an MPU 27, RAM 28, and a sleep control circuit 29. Functions of the components will be described.

Functions of the WDM Coupler 21

The WDM coupler 21 multiplexes and demultiplexes wavelength λ1 for upstream communication and wavelength λ2 for downstream communication in the PON. A downstream communication optical signal with wavelength λ2 is input to the WDM coupler 21 from the optical fiber 4 and is output to the optical receiver 23. An upstream communication optical signal with wavelength λ1 is input from the optical transmitter 22 and is output to the optical fiber 4.

Functions of the Optical Transmitter 22

The optical transmitter 22 receives an electric signal from the PON PHY/MAC logic circuit 24, converts the received signal into an optical signal with wavelength λ1, and outputs it to the WDM coupler 21.

Functions of the Optical Receiver 23

The optical receiver 23 receives an optical signal with wavelength λ2 from the WDM coupler 21, converts the received optical signal into an electric signal, amplifies and shapes the electric signal, and outputs it to the PON PHY/MAC logic circuit 24.

Functions of the PON PHY/MAC Logic Circuit 24

The PON PHY/MAC logic circuit 24 generates a PON frame format based on data input from the NNI-IF circuit 25. The PON PHY/MAC logic circuit 24 converts the PON frame format from parallel to serial and outputs it to the optical transmitter 22. The PON PHY/MAC logic circuit 24 generates a control frame, converts it from parallel to serial, and then outputs it to the optical transmitter 22. The PON PHY/MAC logic circuit 24 receives an electric signal from the optical receiver 23, regenerates a clock, and converts the signal from serial to parallel. The PON PHY/MAC logic circuit 14 then analyzes the received frame and performs a process associated with the frame type. When receiving a user transmission frame, the PON PHY/MAC logic circuit 24 transmits its data to the NNI-IF circuit 25.

Functions of the NNI-IF Circuit 25

The NNI-IF circuit 25 receives a frame from the terminal 5 and outputs it to the PON PHY/MAC logic circuit 24. The NNI-IF circuit 25 receives a frame from the PON PHY/MAC logic circuit 24 and outputs it to the terminal 5.

Functions of the Bus 26, the MPU 27, and the RAM 28

The MPU 27 and the RAM 28 are connected to the PON PHY/MAC logic circuit 24 and the NNI-IF circuit 25 through the bus 26. The MPU 27 performs processes that are not performed in the PON PHY/MAC logic circuit 24. The RAM 28 is used as a packet buffer for upstream and downstream communication and as memory for operations in the MPU 27.

Functions of the Sleep Control Circuit 29

The sleep control circuit 29 monitors states of the UNI-IF circuit 25 and the PON PHY/MAC logic circuit 24. Based on the monitor result, the sleep control circuit 29 controls power states of the PON PHY/MAC logic circuit 24, the UNI-IF circuit 25, the optical transmitter 22, the optical receiver 23, the RAM 27, and the MPU 28. The sleep control circuit 29 can provide control over switching between two modes, a normal mode for operating the ONU 2 using normal power and a sleep mode for operating the same using low power. Whether in the normal mode or the sleep mode, at least the optical transmitter and the optical receiver need to be ready for operation.

Detailed Operations of the PON PHY/MAC Logic Circuit 24

Figure 5:
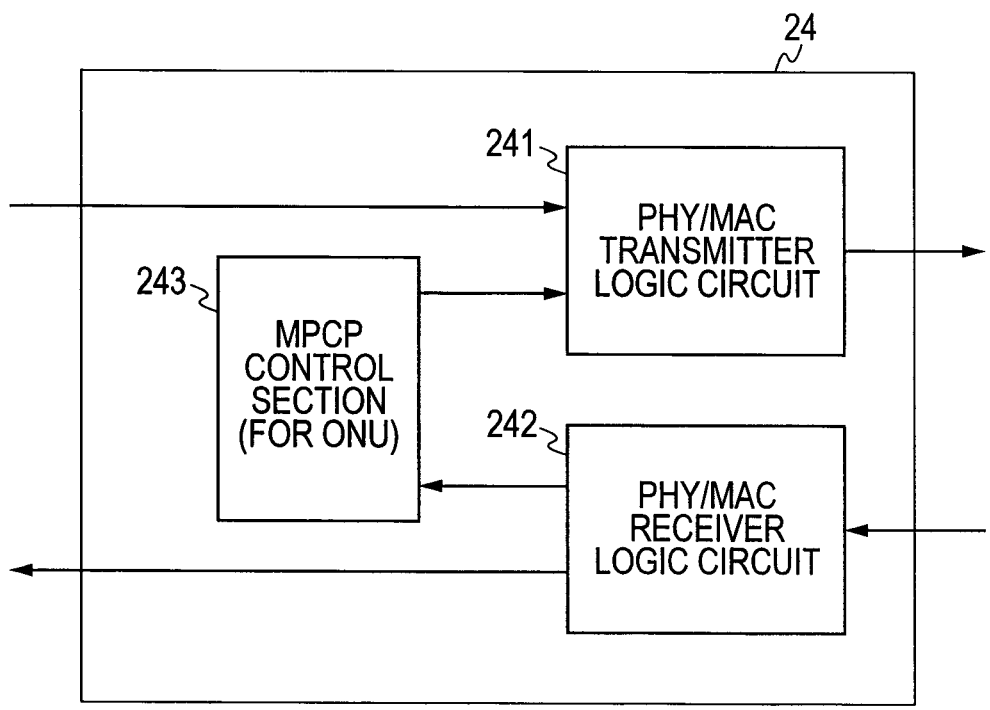
FIG. 5 is a block diagram illustrating a configuration of a PON PHY/MAC logic circuit for the ONU.

Operations of the PON PHY/MAC logic circuit 24 will be described in detail with reference to FIG. 5. The PON PHY/MAC logic circuit 24 includes a PHY/MAC transmitter logic circuit 241 and an MPCP control circuit 243. The PON PHY/MAC logic circuit 24 operates basically the same as the PON PHY/MAC logic circuit 14. The MPCP control circuit 243 differs from the MPCP control circuit 143 in the logic.

Operation for Upstream Reception Frame Analysis in OLT

Figure 6:
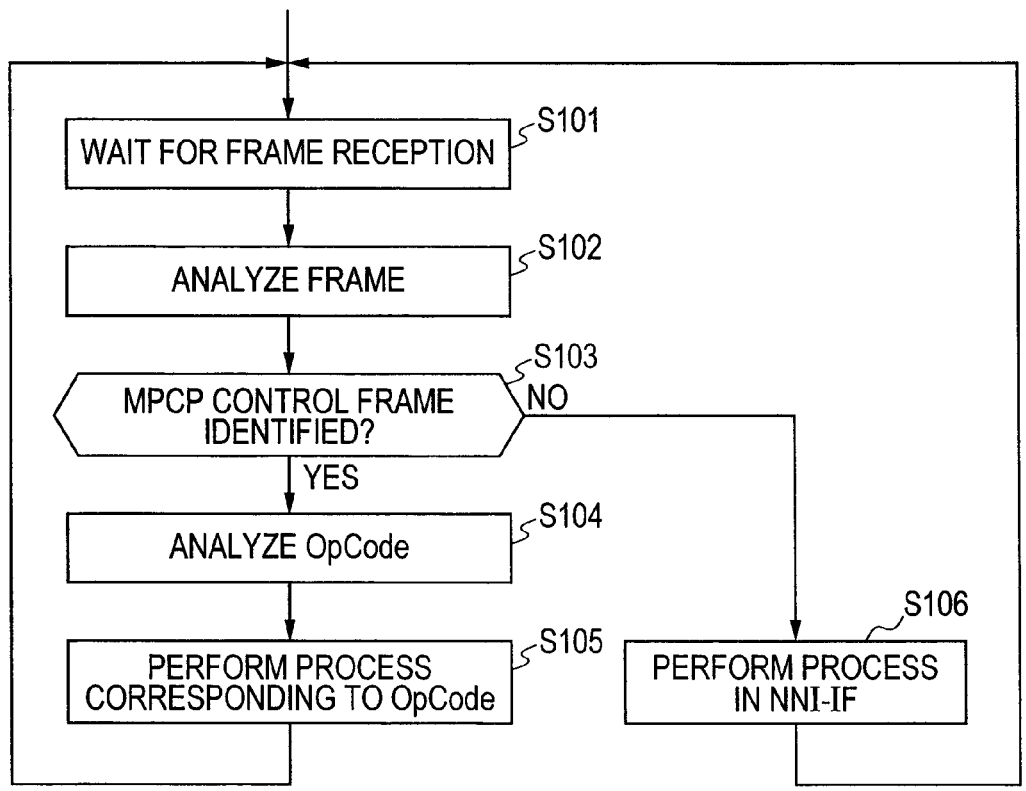
FIG. 6 is a flowchart illustrating an operation for upstream reception frame analysis of the OLT.

With reference to FIG. 6, the following describes an operation for upstream reception frame analysis of the PON PHY/MAC logic circuit 14 in the ONU according to the invention. At S101, the PHY/MAC receiver logic circuit 142 awaits a frame to be received. When the PHY/MAC receiver logic circuit 142 receives a frame through the WDM coupler 11 and the optical receiver 13, control proceeds to S102. The PHY/MAC receiver logic circuit 142 analyzes the received frame. Control proceeds to S103. At S103, based on the frame analysis result, the PHY/MAC receiver logic circuit 142 determines whether the received frame is an MPCP control frame. When the received frame is an MPCP control frame, control proceeds to S104. The MPCP control circuit 143 analyzes OpCode of the received frame. Control proceeds to S105. At S105, the MPCP control circuit 143 performs a process corresponding to OpCode.

The present invention uses an additional control frame for the sleep mode to control switching between the sleep mode and the normal mode. When the process terminates, control returns to S101. When the PHY/MAC logic circuit determines at S102 that the received frame is not an MPCP control frame, control proceeds to S106. At S106, the NNI-IF circuit 15 performs the process. When the process terminates, control returns to S101.

OLT Sleep Process

Figure 7:
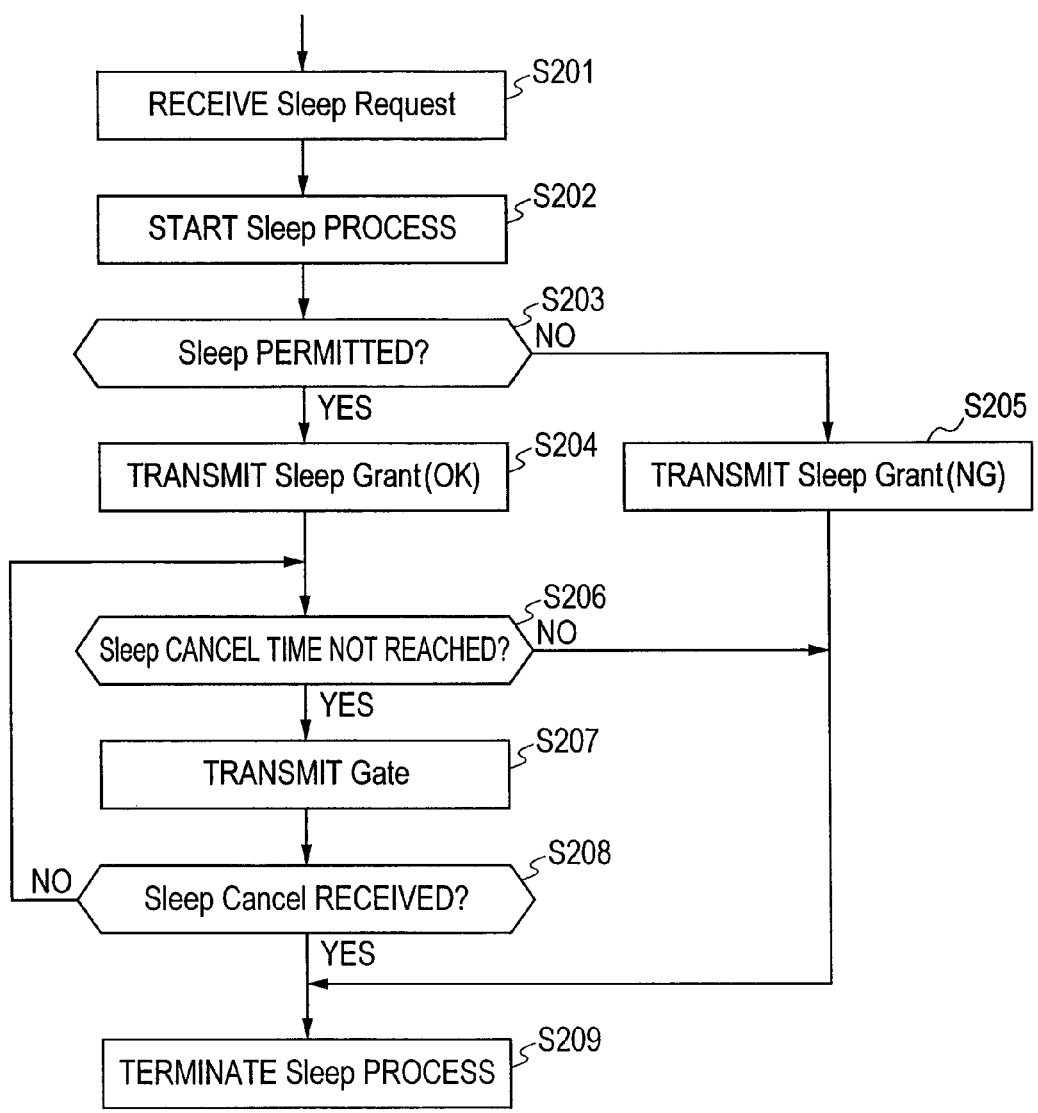
FIG. 7 is a flowchart illustrating a sleep process of the OLT according to the invention.

With reference to FIG. 7, the following describes asleep process of the OLT according to the invention. The received frame may be identified as Sleep Request according to the OpCode analysis in the frame analysis at S104 in FIG. 6. In this case, the MPCP control circuit 143 performs the following sleep process. When receiving Sleep Request at S201, the MPCP control circuit 143 passes control to S202 and starts the sleep process. The MPCP control circuit 143 then proceeds to S203 and determines whether to permit the sleep to the corresponding ONU. When the sleep is permitted, control proceeds to S204. Otherwise, control proceeds to S205. At S205, the MPCP control circuit 143 transmits Sleep Grant (NG) then proceeds to S209 to terminate the sleep process. At the time of the sleep determination, the PHY/MAC transmitter logic circuit 141 also determines the sleep permission based on the presence or absence of a user frame to be transmitted to the ONU. When a user frame to be transmitted to the ONU is available, the PHY/MAC transmitter logic circuit 141 disallows the sleep. At S204, the MPCP control circuit 143 transmits Sleep Grant (OK) to the ONU and proceeds to 206. The Sleep Grant frame format will be described later with reference to FIG. 19. When Sleep Grant (OK) is transmitted to the ONU, the OLT manages that ONU as a sleep-mode ONU. The management method will be described later with reference to FIG. 22. At S206, the MPCP control circuit 143 determines whether the sleep cancel time is reached. The determination uses the time supplied as TimeStamp when the frame is transmitted. Specifically, the MPCP control circuit 143 determines whether TimeStamp representing the current time precedes TimeStamp representing the sleep cancel time configured in the Sleep Grant frame. When the sleep cancel time is not reached, the MPCP control circuit 143 transmits Gate to the ONU and proceeds to S208. The Sleep Grant frame format will be described later with reference to FIG. 19. When the sleep cancel time has elapsed, the MPCP control circuit 143 need not transmit Gate to the ONU and therefore proceeds to S209 to terminate the sleep process.

At S208, the MPCP control circuit 143 determines whether Sleep Cancel is received from the ONU. When receiving Sleep Cancel, the MPCP control circuit 143 proceeds to S209 to terminate the sleep process. When not receiving Sleep Cancel, the MPCP control circuit 143 returns to S206. The Sleep Cancel frame format will be described later with reference to FIG. 20.

By repeating the operation from S206 to S208, the MPCP control circuit 143 periodically transmits Gate to the sleep-mode ONU. When receiving Sleep Cancel from the ONU, the MPCP control circuit 143 stops transmitting Gate so as to be able to resume the normal operation. It may be preferable to manage cycles of Gate to be periodically transmitted to the sleep-mode ONU as will be described with reference to FIG. 21.

Managing the ONU Management State

With reference to FIG. 22, the following describes a method of managing the ONU registration state. The OLT maintains a management table as shown in FIG. 22. The management table contains an ONU ID (identifier), an ONU registration state, and initialization parameters such as LLID for logical link, Ton for Laser ON time in ONU, Toff for Laser OFF time in ONU, and SyncTime for upstream transmission, for example. The ONU ID identifies an ONU to be connected to the OLT. The ONU registration state represents any one of registered, sleep, and unregistered states. The initialization parameters are determined when an ONU is registered during a discovery process. Even when the ONU enters the sleep state, the invention can keep the ONU registered by maintaining the initialization parameters. The OLT need not perform the discovery process for acquiring an initialization parameter when the ONU changes the sleep mode to the normal mode. As a result, it is possible to shorten the time for enabling the communication with the PON when the ONU changes the sleep mode to the normal mode. The initialization parameters in FIG. 22 are provided as an example and may include the other parameters, for example RTT (Round Trip Time) for each ONU.

ONU Operation for Downstream Reception Frame Analysis

Figure 8:
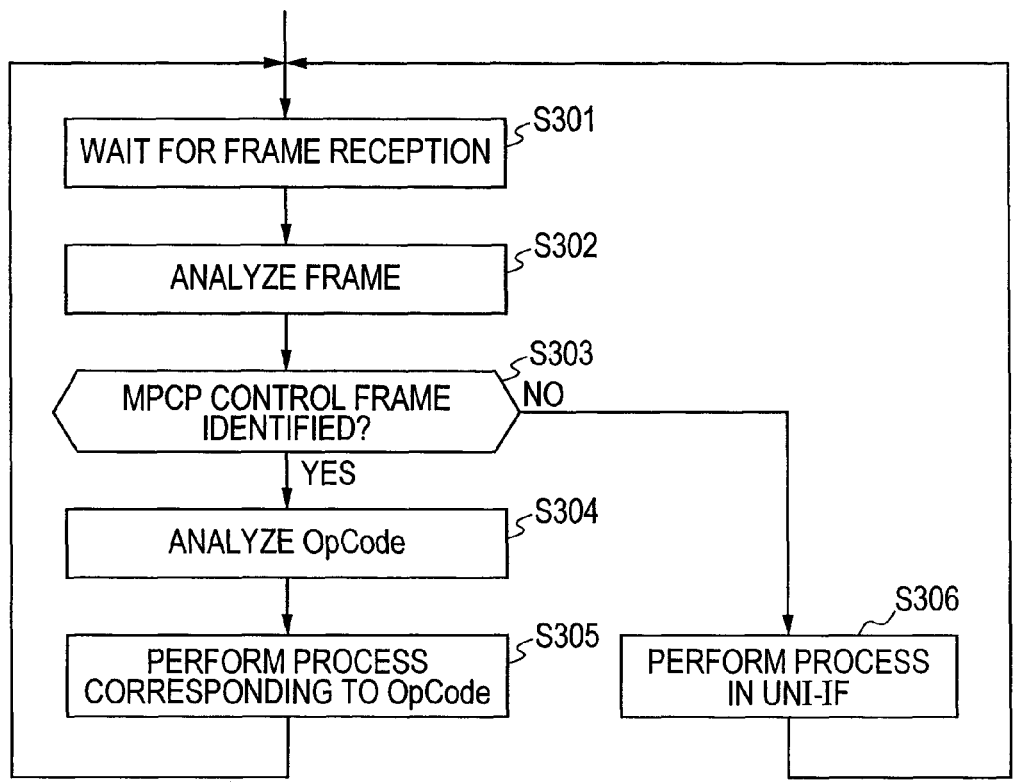
FIG. 8 is a flowchart illustrating an operation for downstream reception frame analysis of the ONU according to the invention.

With reference to FIG. 8, the following describes an operation for downstream reception frame analysis of the ONU according to the invention. At S301, the PHY/MAC receiver logic circuit 242 awaits a frame to be received. When receiving the frame, the PHY/MAC receiver logic circuit 242 proceeds to S302 to analyze the received frame and then proceeds to S303. At S303, based on the frame analysis result, the PHY/MAC receiver logic circuit 242 determines whether the received frame is an MPCP control frame. When the received frame is an MPCP control frame, control proceeds to S304. The MPCP control circuit 243 analyzes OpCode and proceeds to S305. At S305, the MPCP control circuit 243 performs a process associated with OpCode. The present invention adds a control frame for the sleep mode to control switching between the sleep mode and the normal mode. When the process terminates, control returns to S301. When it is determined at S303 that the received frame is not an MPCP control frame, control proceeds to S306. At S306, the UNI-IF circuit performs a process. After the process terminates, control returns to S301.

ONU Sleep Process

Figure 9:
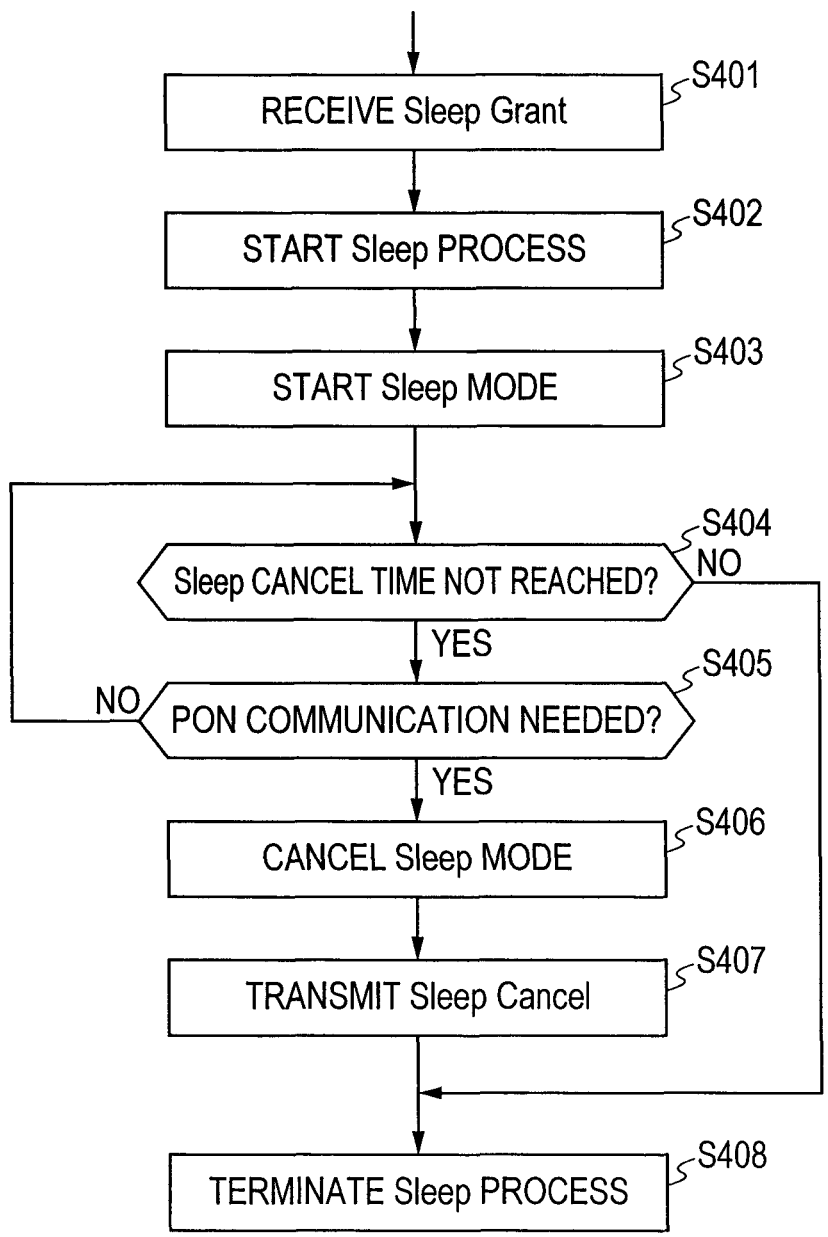
FIG. 9 is a flowchart illustrating a sleep process of the ONU according to the invention.

With reference to FIG. 9, the following describes a sleep process of the ONU according to the invention. The received frame may be identified as Sleep Grant according to the OpCode analysis in the frame analysis. In this case, the ONU performs the sleep process. When receiving Sleep Grant at S401, the ONU proceeds to S402 to start the sleep process. After the sleep process starts, the ONU proceeds to S403 to start the sleep mode. Specifically, the sleep control circuit 29 changes the components to the low power state to enable the sleep mode. Control then proceeds to S404.

At S404, the sleep control circuit 29 determines whether the sleep cancel time is reached. The determination uses the time supplied as TimeStamp when the frame is transmitted. Specifically, the sleep control circuit 29 determines whether TimeStamp representing the current time precedes TimeStamp representing the sleep cancel time configured in the Sleep Grant frame. When it is determined that the sleep cancel time is not reached, control proceeds to S405. When it is determined that the sleep cancel time is reached, control proceeds to S408 to terminate the sleep process.

At S405, based on the monitor result, the sleep control circuit 29 determines whether the PON communication is needed. For example, the PON communication is determined to be needed when an interface section with the terminal changes from the link-down state to the link-up state or when a user frame is received from the terminal. Otherwise, the PON communication is determined to be unneeded. When the PON communication is determined to be needed, the sleep control circuit 29 proceeds to S406. When the PON communication is determined to be unneeded, the sleep control circuit 29 returns to S404.

At S406, the sleep mode is canceled. Specifically, the sleep control circuit 29 changes the components to the normal power state to cancel the sleep mode (to resume the normal mode).

At S407, the sleep control circuit 29 transmits Sleep Cancel to the OLT 1. The sleep control circuit 29 determines the timing to transmit Sleep Cancel based on the Gate frame received from the OLT 1. After transmitting Sleep Cancel, the sleep control circuit 29 proceeds to S408 to terminate the sleep process.

Interoperation Between ONU and OLT According to a Conventional Example

Figure 10:
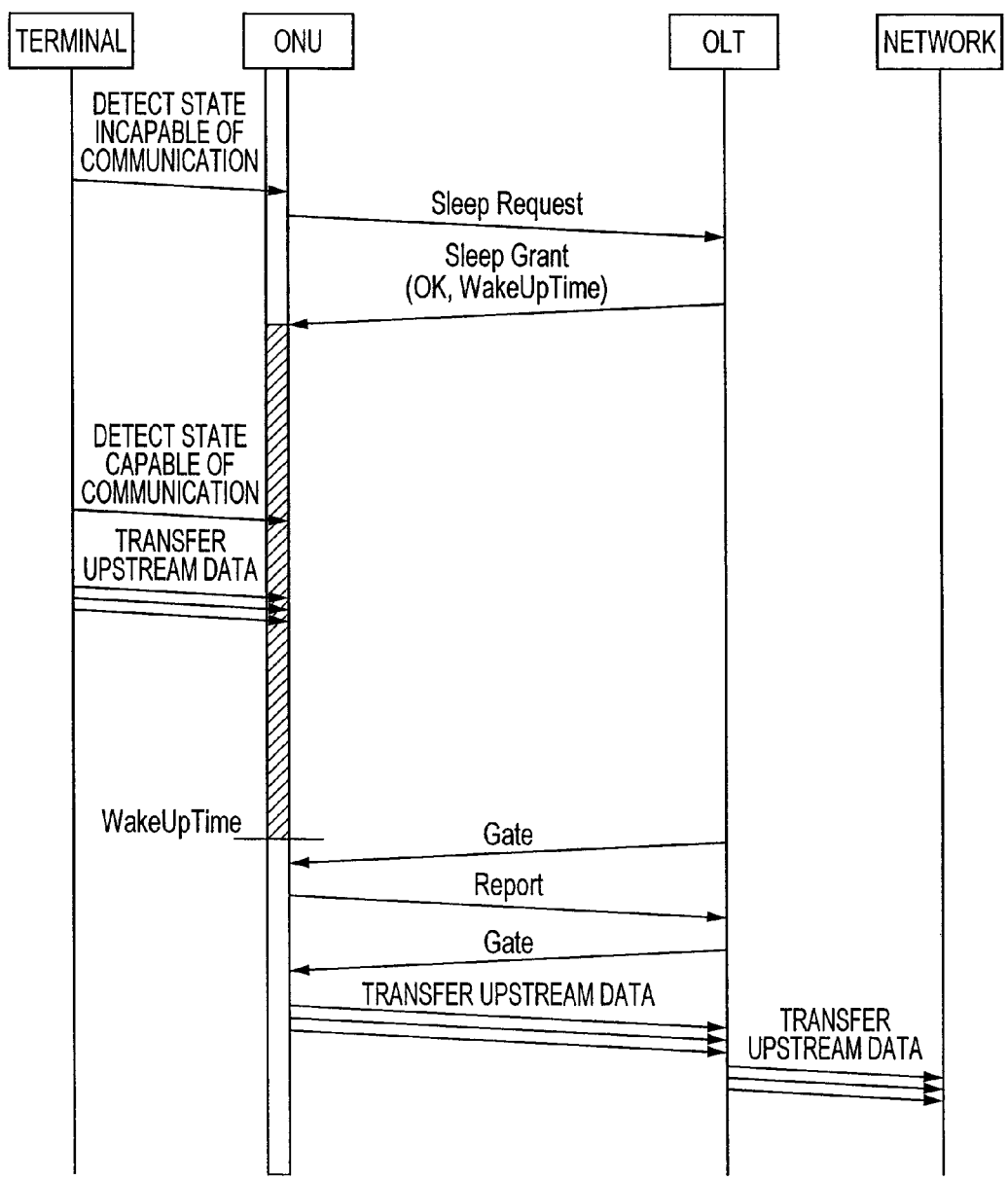
FIG. 10 is a sequence diagram illustrating an interoperation between the OLT and the ONU according to a conventional embodiment.

With reference to FIG. 10, the following describes an interoperation between the ONU and the OLT according to a conventional example (IEEE P802.3av Task Force "3av_0809_mandin_4.pdf").

The description assumes that the ONU remains in the normal state. In this state, the ONU 2 detects that communication with the PON is unneeded according to the terminal state. The sleep control circuit 29 determines the maximum sleep time and transmits Sleep Request to the OLT1. When receiving Sleep Request from the ONU 2, the OLT 1 determines availability of the sleep mode and the sleep cancel time for the ONU 2 and transmits Sleep Grant to the ONU 2. When receiving Sleep Grant, the ONU 2 enters the sleep mode until Sleep WakeUpTime specified in Sleep Grant. After entering the sleep mode, the ONU 2 may detect the state capable of communication in accordance with the terminal state before WakeUpTime as the sleep cancel time. The ONU 2 buffers data that is received from the terminal afterwards. When the sleep cancel time WakeUpTime is reached, the OLT assumes that the ONU 2 returns to the normal mode. The OLT transmits Gate to the ONU 2. When receiving Gate, the ONU 2 transmits Report to the OLT using the time and the period specified in Gate. The ONU 2 requests the upstream band allocation based on the amount of stored buffer. When receiving Report, the OLT determines the upstream band allocation for the ONU based on a buffer size contained in Report. The OLT then transmits Gate to the ONU. When receiving Gate, the ONU transmits upstream data to the OLT using the specified time and period. The OLT receives the upstream data and transfers it to the network.

This operation causes a delay in the upstream data transfer because no upstream band is allocated until the sleep cancel time WakeUpTime is reached. The amount of upstream data delay depends on the specified sleep period.

Interoperation Between ONU and OLT According to the Present Invention

Figure 11:
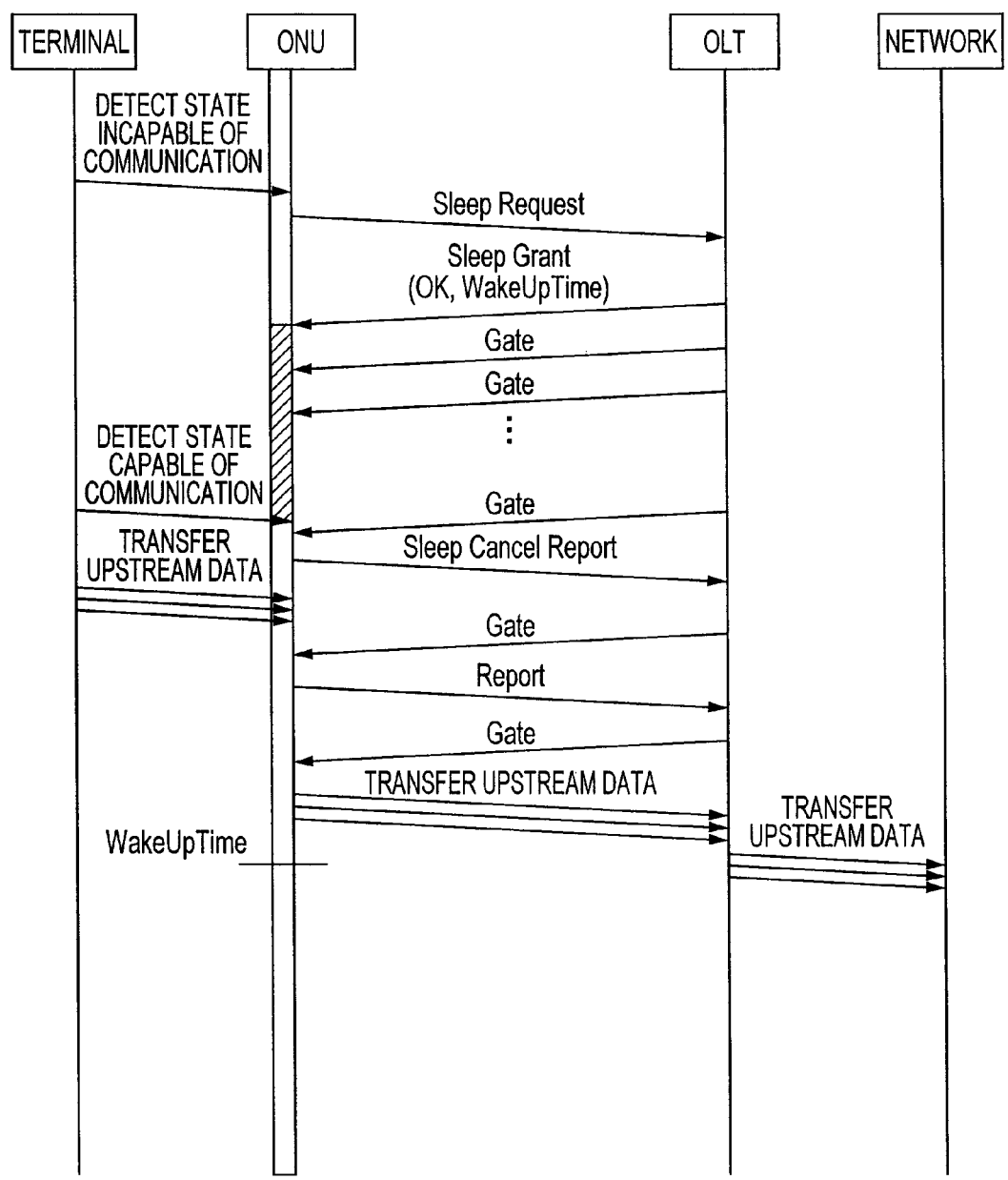
FIG. 11 is a sequence diagram illustrating an interoperation between the OLT and the ONU according to a first embodiment of the invention.

With reference to FIG. 11, the following describes an interoperation between the ONU and the OLT according to the present invention. The OLT 1 and the ONU 2 are configured as shown in FIGS. 2, 3, 4, and 5.

The description assumes that the ONU remains in the normal state. Based on the terminal state, the ONU may detect that communication with the PON is unneeded. In this case, the ONU transmits Sleep Request containing the predetermined maximum sleep time to the OLT 1. When receiving Sleep Request, the OLT 1 determines availability of the sleep mode and the sleep cancel time as described in FIG. 7 and transmits Sleep Grant to the ONU 2. When receiving Sleep Grant, the ONU 2 enters the sleep mode as described in FIG. 9. As described in FIG. 7, the OLT continues transmitting Gate based on the predetermined cycle and upstream band allocation to the ONU in the sleep mode. Even before the sleep cancel time, the ONU can change from the sleep mode to the normal mode. While in the sleep mode, the ONU does not or cannot respond to Gate.

When detecting the state capable of communication based on the terminal state, the ONU cancels the sleep mode before sleep cancel time WakeUpTime as described in FIG. 9. Further, as described in FIG. 9, the ONU transmits Sleep Cancel Report using the time and the period specified in Gate received from the OLT. When receiving Sleep Cancel Report, the OLT terminates the sleep process for the ONU as described in FIG. 7. The OLT then transmits Gate to the ONU. After detecting the state capable of communication as described in FIG. 7, the ONU buffers upstream data received from the terminal. When receiving Gate from the OLT after transmission of Sleep Cancel Report, the ONU transmits Report to the OLT based on a buffer size stored in the ONU and requests the upstream band allocation. Based on the received Report, the OLT determines the upstream band to be allocated to the ONU and transmits Gate. When receiving Gate, the ONU transmits upstream data to the OLT using the allocated band. The OLT receives the upstream data from the ONU and transfers it to the network.

This operation enables communication with the PON before the sleep cancel time WakeUpTime while preventing the use efficiency of upstream bands from degrading. A delay in the upstream data transfer can be decreased. The amount of upstream data delay depends on the cycle of Gate transmitted from the OLT during the sleep period, not on the predetermined sleep time.

Extended MPCP Control Frames

The following describes MPCP control frame formats used in the present invention with reference to FIGS. 14 through 20. FIG. 14 shows a frame format used for EPON. When an MPCP control frame is used, OpCode F105 contains a value indicating the control frame type. Fields F101 to F108 are the same as those in the frame format defined in IEEE 802.3av and a description is omitted for simplicity.

FIGS. 17, 18, and 19 show MPCP control frame formats for Normal Gate, Discovery Gate, and Report frames, respectively. These frame formats are the same as those defined in IEEE 802.3av and a description is omitted for simplicity.

With reference to FIG. 18, the following describes the contents of fields in a Sleep Request frame. Using the Sleep Request frame, the ONU requests the sleep permission from the OLT. OpCode F504 contains a value representing Sleep Request. The value is set to 0x0007 in this embodiment and may be otherwise specified so as to be compliant with the IEEE 802.3av standard. Max Sleep Time F506 contains the maximum sleep time the ONU requests from the OLT. Based on Max Sleep Time, the OLT determines WakeUpTime, i.e., the time to cancel the sleep mode. An appropriate sleep time may depend on ONUs, the traffic state of each ONU, or time slots. The ONU needs to notify an appropriate sleep time. The maximum value is input because an available sleep time may be restricted due to limitations on a counter for timekeeping in the ONU. The other fields are the same as those defined in IEEE 802.3av and a description is omitted for simplicity.

With reference to FIG. 19, the following describes the contents of fields in a Sleep Grant frame. Using the Sleep Grant frame, the OLT notifies the ONU of sleep permission. OpCode F604 contains a value representing Sleep Grant. The value is set to 0x0008 in this embodiment and may be otherwise specified so as to be compliant with the IEEE 802.3av standard. Sleep Permission F606 contains a value representing whether to permit the sleep. For example, value 0x01 permits the sleep. Value 0x02 does not permit the sleep. WakeUpTime F607 contains the time when the ONU cancels the sleep mode. The ONU cancels the sleep mode by the time specified in WakeUpTime. Resuming the normal mode from the sleep mode takes time. The ONU passes control from the sleep mode to the normal mode early enough to compensate for the recovery time. The ONU cancels the sleep mode even before the time specified in WakeUpTime when detecting the need for communication with the PON because a terminal connected to the ONU becomes capable of communication, for example. The other fields are the same as those defined in IEEE 802.3av and a description is omitted for simplicity.

With reference to FIG. 20, the following describes the contents of fields in a Sleep Cancel Report frame. Using the Sleep Cancel Report frame, the ONU notifies the OLT that the sleep state is canceled. OpCode F704 contains a value representing Sleep Cancel Report. The value is set to 0x0009 in this embodiment and may be otherwise specified so as to be compliant with the IEEE 802.3av standard. The frame format itself is the same as the Report frame and differs from it in the OpCode value.

The above-mentioned Sleep Cancel Report frame is provided as an example. The Report frame may replace the Sleep Cancel Report frame. The Sleep Cancel Report frame format may differ from the Report frame format. While the Report frame format contains eight Queue Report fields, the Sleep Cancel Report frame format may contain four Queue Report fields, for example.

According to the first embodiment, the communication with the PON can be resumed in a short period of time even before the sleep cancel time while the use efficiency of upstream bands is prevented from degrading. Since a long sleep period can be specified, the power consumption is lower than conventional technologies.

Second Embodiment

Figure 12:
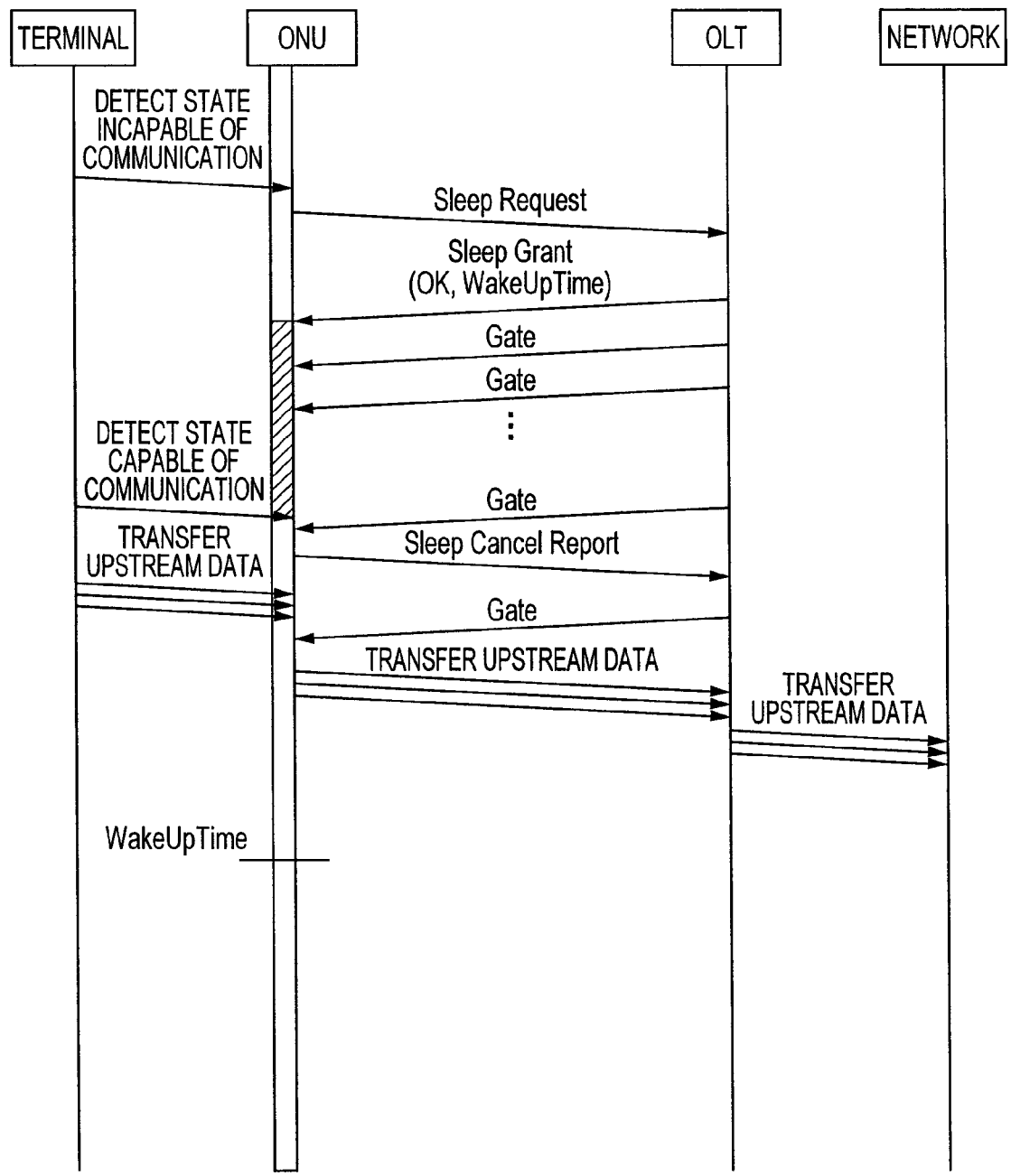
FIG. 12 is a sequence diagram illustrating an interoperation between the OLT and the ONU according to a second embodiment of the invention.

With reference to FIG. 12, the following describes the second embodiment of the invention. The main topic will focus on differences from the first embodiment. According to the first embodiment, the ONU transmits Sleep Cancel Report, then receives Gate, transmits Report, receives Gate, and transmits upstream data to resume the normal state.

The second embodiment eliminates one reciprocation of receiving Gate and transmitting Report. That is, the ONU transmits Sleep Cancel Report, then receives Gate, and transmits upstream data to resume the normal state.

This is accomplished as follows. The ONU requests a predetermined upstream band when transmitting Sleep Cancel Report. That is, the ONU always requests a specified band even when the amount of upstream buffer is zero. When receiving Sleep Cancel Report, the OLT determines the band allocation for the ONU based on the upstream band request in Sleep Cancel Report and transmits Gate to the ONU. The ONU transmits upstream data to the OLT at the time specified in Gate. The OLT transfers the upstream data received from the ONU to the network.

The second embodiment can resume the communication with the PON in a shorter period of time than the first embodiment.

Third Embodiment

Figure 13:
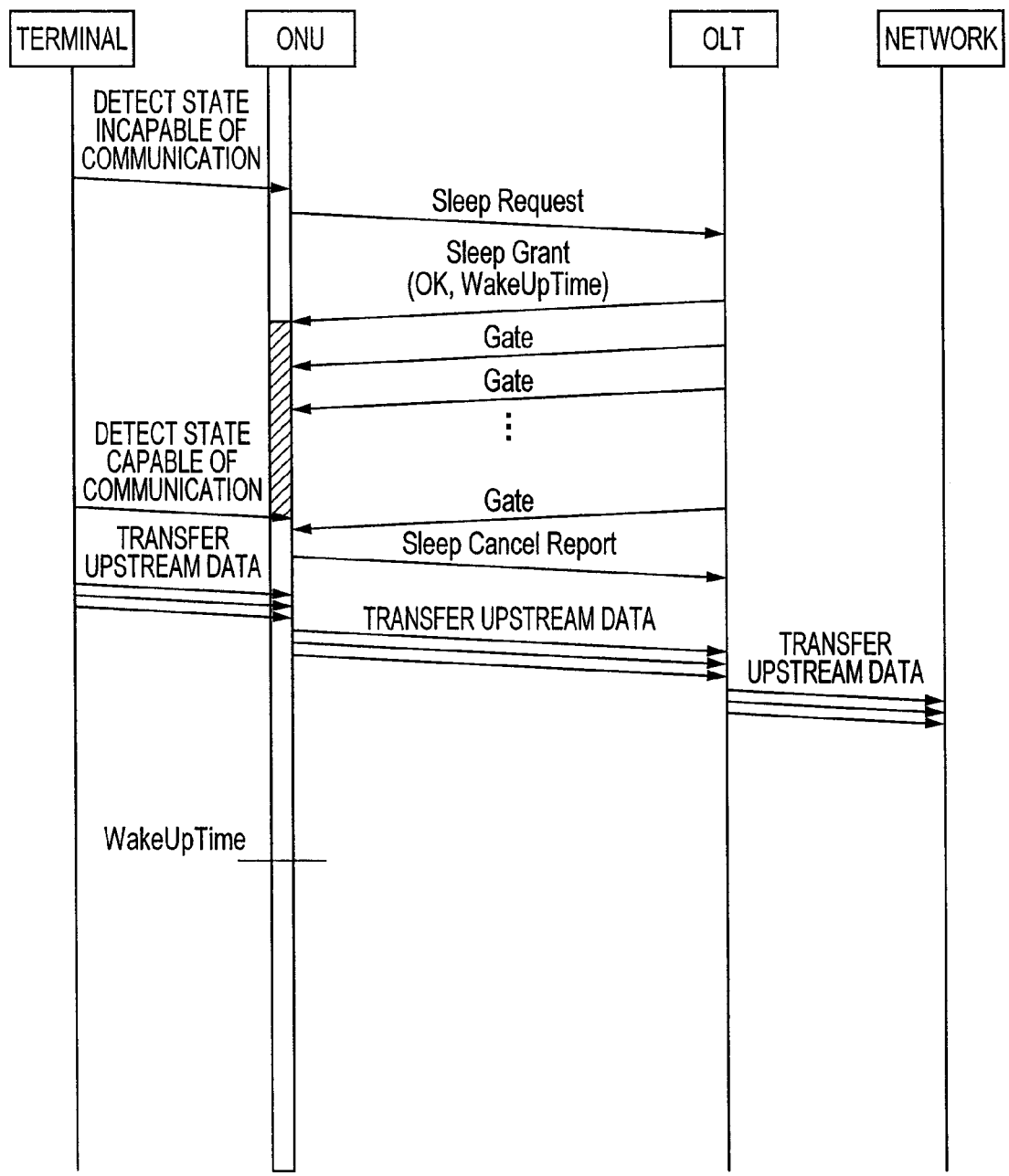
FIG. 13 is a sequence diagram illustrating an interoperation between the OLT and the ONU according to a third embodiment of the invention.
Figure 23:
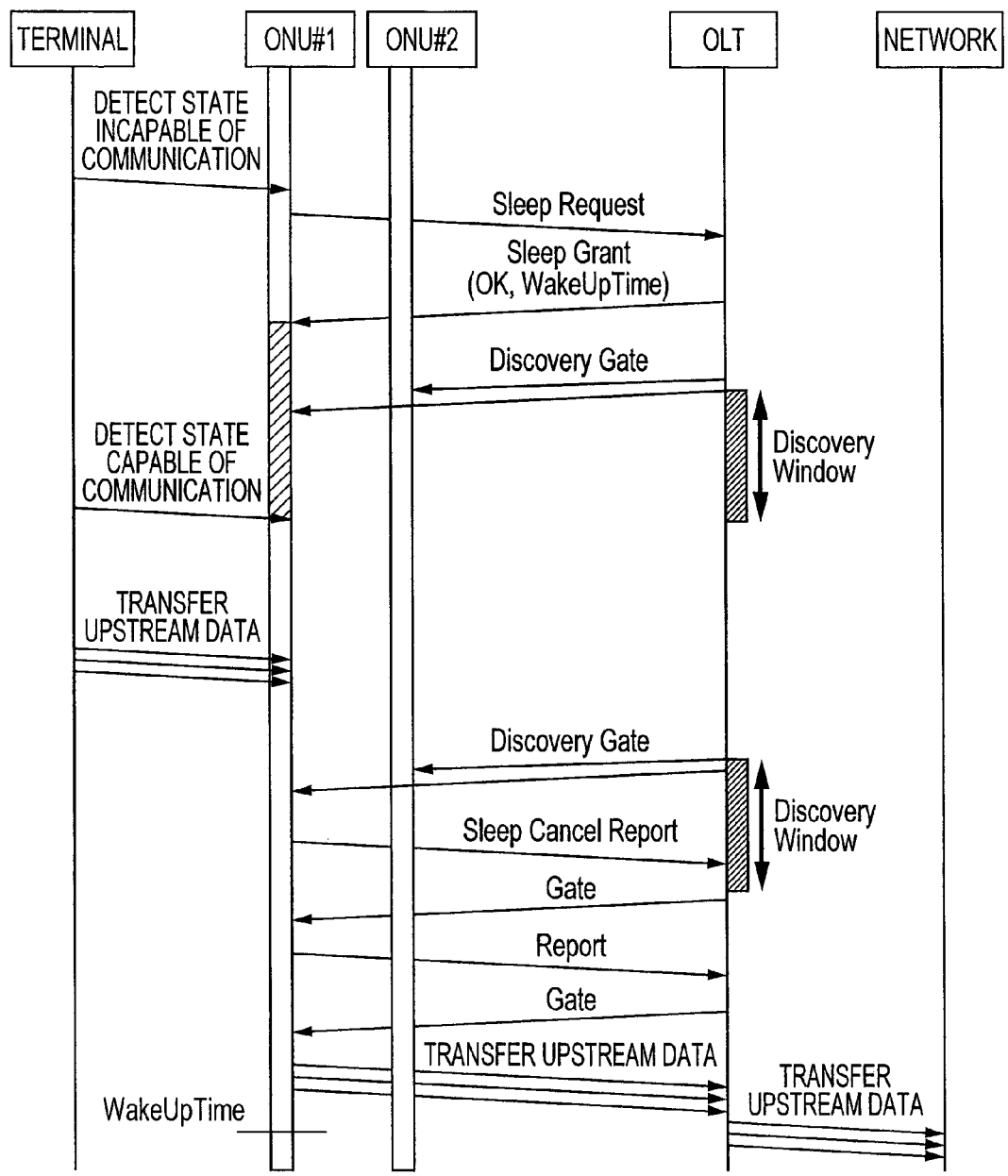
FIG. 23 is a sequence diagram illustrating an interoperation between the OLT and the ONU according to another conventional embodiment.

With reference to FIG. 13, the following describes the third embodiment of the invention. The main topic will focus on differences from the second embodiment. According to the second embodiment, the ONU transmits Sleep Cancel Report, then receives Gate, and transmits upstream data to resume the normal state. According to the third embodiment, the ONU transmits Sleep Cancel Report and then transmits upstream data without receiving Gate to resume the normal state.

This is accomplished as follows. According to the first and second embodiments, Gate transmitted from the OLT to the sleep-mode ONU allocates only the band transmitted in Sleep Cancel Report. According to the third embodiment, Gate transmitted from the OLT to the sleep-mode ONU always allocates a predetermined band in addition to the band transmitted in Sleep Cancel Report. After detecting a state capable of communication, the ONU receives Gate from the OLT, uses the allocated band, and transmits Sleep Cancel Report and upstream data.

The third embodiment can resume the communication with the PON in a much shorter period of time than the second embodiment. However, the third embodiment allocates an extra band to the sleep-mode ONU, degrading the upstream band use efficiency. To solve this problem, a band to be allocated to the sleep-mode ONU is determined based on upstream band requests from the other ONUs.

Optimizing the Amount of Delay and the Allocation Band for Each ONU

The first, second, and third embodiments have described the interoperation between a single ONU and the OLT. The amount of delay allowable for a subscriber or an ONU is not always constant. Therefore, all ONUs in the sleep mode need not be given constant values for the transmission cycle and the allocation band of the Gate to be transmitted to the ONUs. In this case, a band allocation management table in sleep mode is needed as will be described with reference to FIG. 21.

The band allocation management table in sleep mode contains an ONU ID, a gate transmission cycle in sleep mode, and a band allocated in sleep mode. The ONU ID identifies an ONU connected to the OLT and takes any of values 1 to n, where n is the number of PON branches. An ONU MAC address may replace the ONU ID. The gate transmission cycle in sleep mode represents the cycle of Gate that is periodically transmitted to the sleep-mode ONU. Generally, EPON transmits Gate at a DBA cycle of T_dba. The cycle can be easily specified when it is equal to the integral multiple of T_dba. The band allocated in sleep mode represents the amount of upstream band allocated in Gate to be transmitted to the sleep-mode ONU. The band allocation management table in sleep mode is configured before an ONU is connected and the service starts. Values in the table may be changed during operation. For example, the values can be changed from an operation and maintenance terminal connected to the OLT via the network. The values depend on the service quality needed for each ONU. For example, there may be a need to reduce the ONU power consumption despite a long delay time. In such a case, the table contains a long gate transmission cycle in sleep mode and a small band allocated in sleep mode.

Supplement

While there have been described the frame formats for 10GE-PON (IEEE 802.3av), the embodiments are also applicable to frame formats for E-PON (IEEE 802.3ah) and G-PON.

What is claimed is:

1. A communication system comprising:
   at least one terminal unit; and
   a control unit that exchanges data with the at least one terminal unit, wherein the at least one terminal unit includes:
      a reception unit that receives a frame transmitted from the control unit;
      a transmission unit that transmits a frame to the control unit;
      a control circuit that processes the frame; and
      a sleep control circuit that enables a power-saving state for at least a part of one of the at least one terminal unit;
   wherein the control unit includes:
      a reception unit that receives a frame transmitted from the at least one terminal unit;
      a transmission unit that transmits a frame to the at least one terminal unit; and
      a control circuit that processes the frame; wherein
         the control circuit of the control unit cyclically allocates, to the at least one terminal unit, in a power-saving state of the at least one terminal unit, a band for the at least one terminal unit, in the power-saving state of the at least one terminal unit, to transmit a sleep cancel report to the control unit, and
         the transmission unit of the control unit cyclically transmits a control frame containing allocation information about the band to the at least one terminal unit in the power-saving state of the at least one terminal unit.

2. The communication system according to claim 1, wherein
   the at least one terminal unit and the control unit maintain initialization information settled in a discovery process for the at least one terminal unit before the power-saving state is enabled; and
   when the at least one terminal unit recovers from the power-saving state and resumes a normal state, the control unit omits a discovery process and references the maintained initialization information to register the at least one terminal unit.

3. The communication system according to claim 1, wherein
   the sleep cancel report contains upstream band request information;
   the at least one terminal unit has a buffer for upstream communication and determines upstream band request information based on a buffer size stored in the buffer;
   the at least one terminal unit transmits a sleep cancel report containing the upstream band request information to the control unit; and
   the control unit changes the at least one terminal unit from the power-saving state to a registered state and then allocates an upstream band based on the upstream band request information.

4. The communication system according to claim 1, wherein
   the sleep cancel report contains upstream band request information;
   the at least one terminal unit has a buffer for upstream communication and determines upstream band request information based on a predetermined upstream band.

5. The communication system according to claim 1, wherein
   the control circuit of the control unit cyclically allocates, to the at least one terminal unit, in the power-saving state of teh at least one terminal unit, a sum of a band for the terminal unit, in the power-saving state of the at least one terminal unit, to transmit the sleep cancel report to the control unit and a predetermined band, and
   the transmission unit of the control unit cyclically transmits a control frame containing allocation information about the band to the at least one terminal unit in the power-saving state of the at least one terminal unit.

6. The communication system according to claim 1,
   wherein each of the at least one terminal unit is assigned a different value for a cycle and a band to be allocated in the sleep cancel report.

7. The communication system according to claim 1, wherein
   the control unit transmits a band allocation frame for the sleep cancel report to the at least one terminal unit in the power-saving state of the at least one terminal unit, and
   the at least one terminal unit, in the power-saving state of the at least one terminal unit, transmits the sleep cancel report in response.

8. A control unit that is connected to at least one terminal unit and exchanges data with the at least one terminal unit, the control unit comprising:
   a reception unit that receives a frame transmitted from the at least one terminal unit;
   a transmission unit that transmits a frame to the at least one terminal unit; and
   a control circuit that processes the frame; wherein
      the control circuit of the control unit cyclically allocates, to the at least one terminal unit, in a power-saving state of the at least one terminal unit, a band for the terminal, in the power-saving state of the at least one terminal unit, to transmit a sleep cancel report to the control unit, and
      the transmission unit of the control unit cyclically transmits a control frame containing allocation information about the band to the at least one terminal unit in the power-saving state of the at least one terminal unit.

9. The communication system according to claim 1, wherein
   the control unit transmits a frame including information indicating a wake-up time, and
   the at least one terminal unit, in the power-saving state of the at least one terminal unit, transmits the sleep cancel report according to the allocation information before the wake-up time.

10. The control unit according to claim 8, wherein
the transmission unit transmits a frame including information
indicating a wake-up time, and the reception unit receives the sleep cancel report transmitted from the at least one terminal unit, in the power-saving state of the at least one terminal unit, according to the allocation information before the wake-up time.

* * * * *